E. C. GRAVES.
WEED KILLING IMPLEMENT.
APPLICATION FILED NOV. 22, 1919.
1,395,637.
Patented Nov. 1, 1921.
3 SHEETS—SHEET 1.
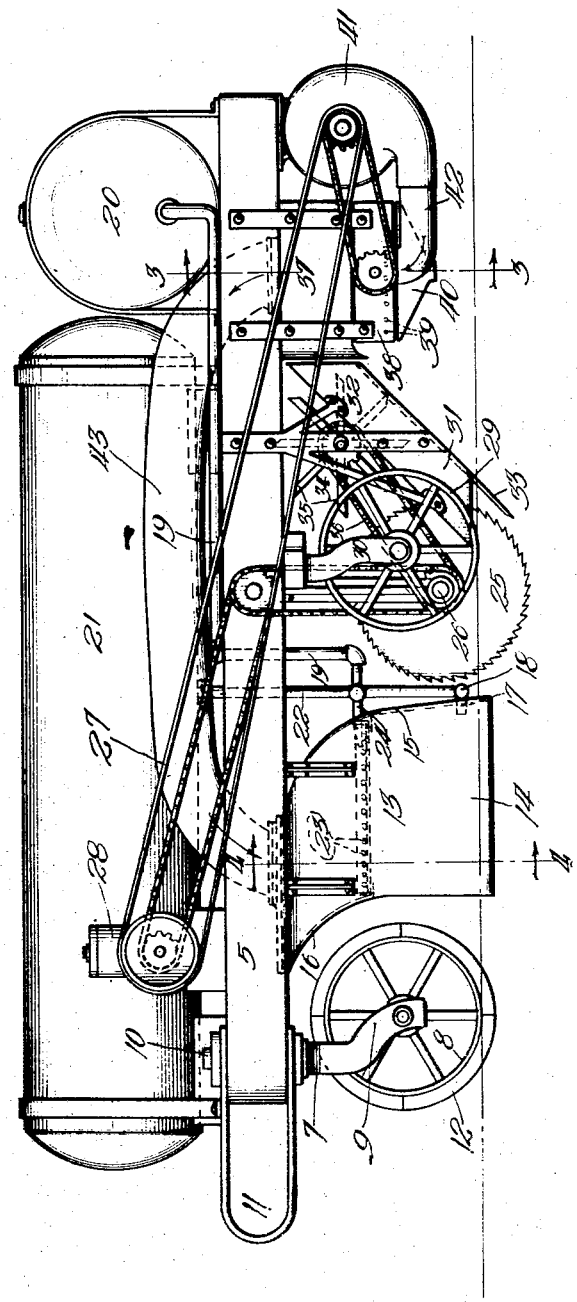
Witness:
Harry S Gaither
INVENTOR
Eugene C. Graves
By Banning & Banning
ATTORNEYS.

E. C. GRAVES.
WEED KILLING IMPLEMENT.
APPLICATION FILED NOV. 22, 1919.
1,395,637.
Patented Nov. 1, 1921.
3 SHEETS—SHEET 2.
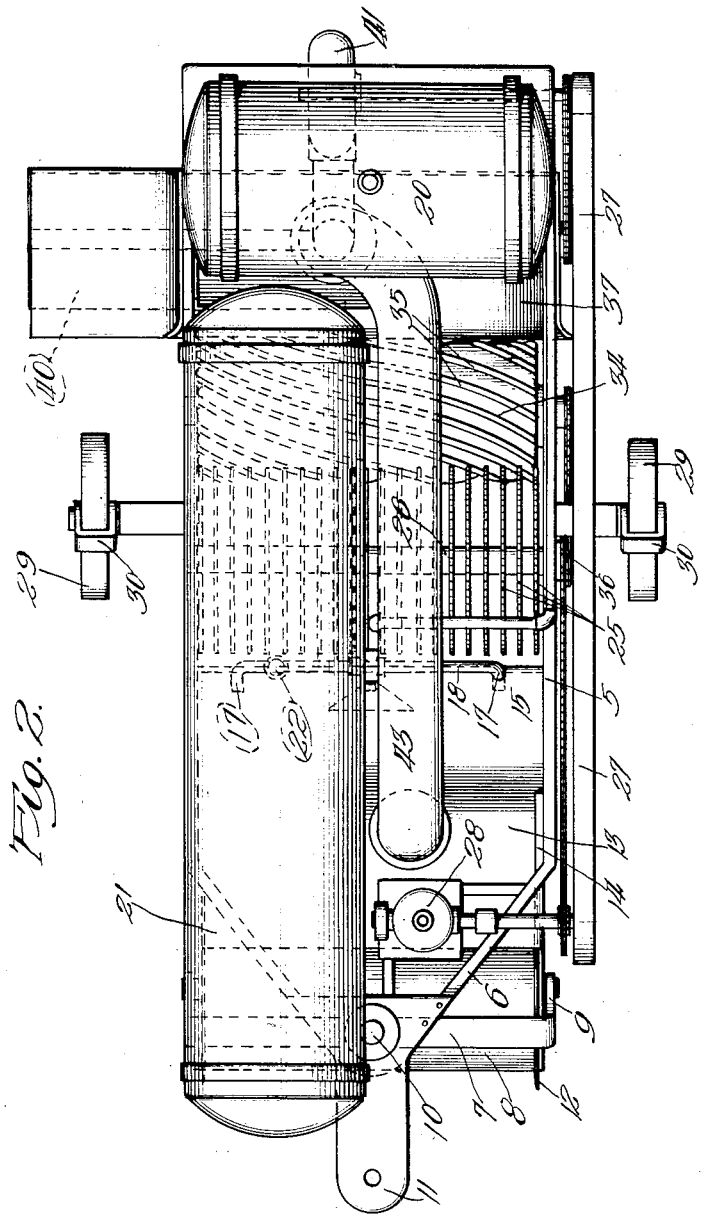

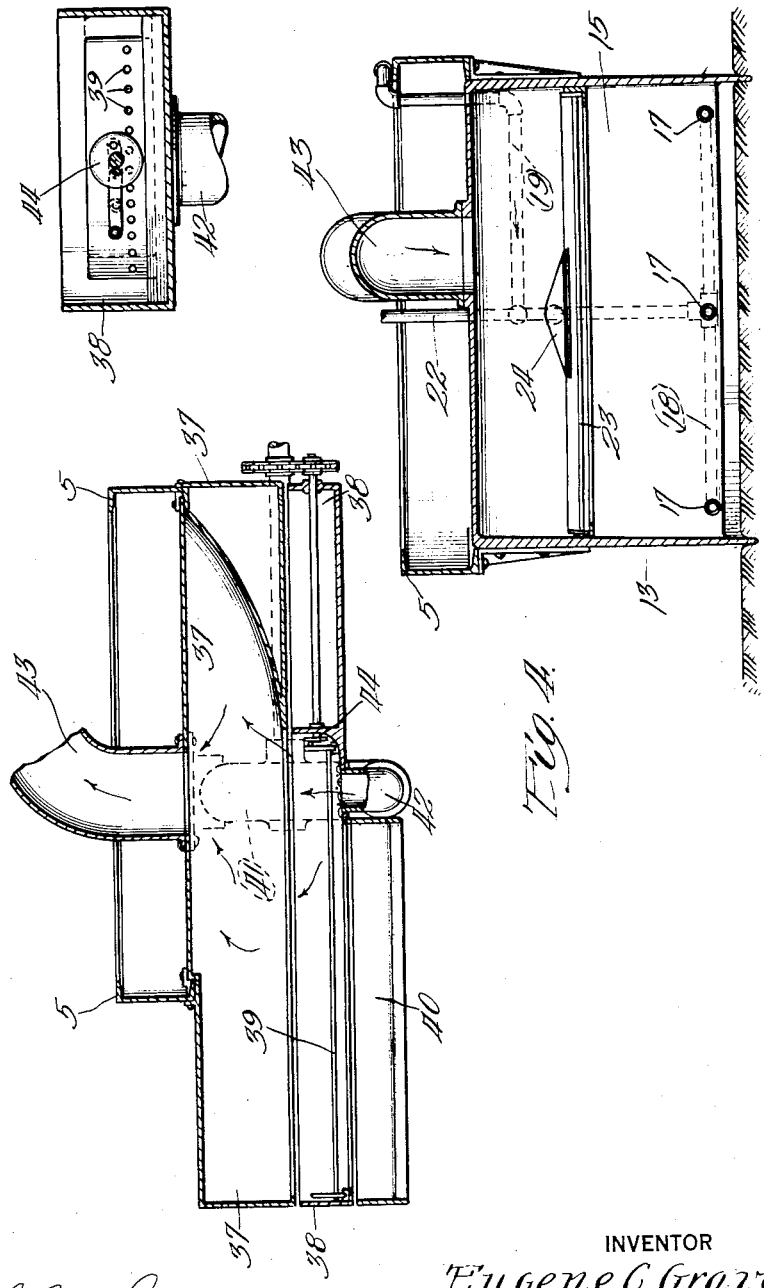

UNITED STATES PATENT OFFICE.

EUGENE C. GRAVES, OF KANKAKEE, ILLINOIS.

WEED-KILLING IMPLEMENT.

1,395,637.  Specification of Letters Patent.  Patented Nov. 1, 1921.

Application filed November 22, 1919. Serial No. 339,895.

*To all whom it may concern:*

Be it known that I, EUGENE C. GRAVES, a citizen of the United States, residing at Kankakee, in the county of Kankakee and State of Illinois, have invented certain new and useful Improvements in Weed-Killing Implements, of which the following is a specification.

This invention relates to an implement which is designed primarily for the killing and eliminating of weeds from the soil, and which incidentally to the killing operation serves to thoroughly pulverize, aerate and redistribute the soil, so that after the passage of the machine the soil will be in a finely divided condition and ready to receive the seed. The apparatus is designed to completely eradicate and burn up the tops and roots of noxious weeds so that the soil will be completely purified, and the weeds, seeds, eggs and larva of destructive insects destroyed and the ground completely pulverized and leveled down in one and the same operation, thereby reducing the time and cost of preparing the seed bed and reducing the necessity for repeated cultivation of the soil for the purpose of destroying or impeding development of the noxious weeds during the growing season.

Further objects and purposes of the invention will appear from a detailed description thereof which consists in the features of construction and combination of parts hereinafter described and claimed.

In the drawings:

Figure 1 is a side elevation of a machine in suitable form to embody the features of the present invention;

Fig. 2 is a top or plan view of the same;

Fig. 3 is a sectional view taken on line 3—3 of Fig. 1;

Fig. 4 is a sectional view taken on line 4—4 of Fig. 1, and Fig. 5 is a sectional detail of the shaker.

The method of mounting and arranging the several instrumentalities required in the several operations involved, as set forth in the drawings, serves by way of exemplification of the underlying principles, but it will be understood that these details may be modified without departing from the spirit of the invention.

In the machine as illustrated, a frame is employed consisting of side rails 5 which converge at their forward ends 6 to afford a mounting for a pivotally mounted yoke 7 which carries a roller 8 which serves as a support for the forward end of the frame. The depending side arms 9 of the yoke are turned toward the rear to give a castering action, and the pintle 10 of the yoke serves as a point of securement for a draft member 11 which may be secured to a team, tractor, or other source of power. The roller 8, near each of its outer ends, is provided with a cutting flange 12, which flanges, as the implement is advanced, cut a number of parallel grooves or channels which mark off the section of soil to be purified and pulverized by the appliances carried by the machine. The roller also serves to break or crush down the upstanding weeds or grasses, which are thus laid close to the soil in preparation for the burning of the tops by the appliances now to be described.

Immediately behind the roller 8 is a burner 13 provided with side walls 14, the lower edges of which are alined with the cutting flanges on the roller and are projected below the soil level and in position to enter the grooves formed by the flanges so as to confine the burning to the strip of soil immediately under treatment. The burner is provided on the rear side with a wall 15 which gives to the entire structure the form of a shield open at the bottom and closed at the sides and back, and partially inclosed in front by the provision of a forwardly curving front wall 16, the roller itself serving in front to confine the fire within a restricted area.

The burner is provided near the ground level with a series of nozzles 17 carried by a cross header pipe 18 connected with a supply pipe 19 for liquid fuel which is preferably carried in a tank 20 at the rear end of the frame; and in order to produce an intense heat which will serve to quickly consume the weed tops during the relatively short period of time occupied by the advance of the machine over a given section of ground, a compression tank 21 is provided which furnishes a blast of air through a suitable pipe 22, so that the flame projected from the burner nozzles will enter the burner under forced draft and an intense heat will be generated at or near the ground level. The burner also is provided, at a point above the ground level, with a grating 23 to which the roots of the weeds are delivered by means presently to be described, and this grating serves to retain the weeds while they are being consumed by jets of flame blown through nozzle 24 in suitable communication with the fuel tank, and with the pressure tank so as to project the flame under forced draft, and with a view of developing an intense heat to insure a quick combustion of the roots. The piping arrangement shown is merely by way of exemplification since any convenient location of the fuel and pressure tanks and any convenient piping system may be employed to secure the results specified.

Immediately behind the burner shield is located a gang of circular saws 25 which are preferably spaced about two or three inches apart and mounted upon a shaft 26 driven by any suitable power mechanism, as for instance a gasolene engine 28 suitably located upon the frame of the implement. The circular saws are located in suitable vertical relation to the frame so as to project deeply into the surface of the soil, and, when driven at high speed, will serve to cut through the weed roots matted below the soil surface and thereby divide the soil into narrow strips or ribbons in preparation for its removal and purification by means now to be described.

The level of the rear end of the implement and the depth of penetration of the circular saw cutters are regulated by a pair of rear supporting wheels 29 one on each side of the implement, each of which is mounted in a caster bracket 30 swiveled to the side rails of the machine in any suitable manner. Immediately behind the saws and within the space subtended between the wheels is located an inclined runway 31 having side walls 32 and a cutting lip 33 which projects below the ground level and serves to upturn the strips or ribbons of soil cut by the circular saw cutters, divert the ribbons of soil thus cut up the runway or chute and into the field of action of a cross cutter 34 having a series of spirally arranged cutter blades 35 disposed after the manner of the blades of a lawn mower, which cross cutter is driven at a high rate of speed through suitable belt or other power connections 36 deriving power from the gasolene engine, with the result that the strips or ribbons cut longitudinally by the action of the gang of circular cutters will be cross cut and divided into small chunks by the action of the cross cutter, and largely disintegrated and beaten up, with a view of loosening the soil from the roots in preparation for the final elimination of foreign material from the soil. The chunks of soil thus beaten up and disintegrated will be forced or thrown under the influence of the cross cutters into a hopper 37, whence they will fall into a shaker 38 having a screen or grating 39 near the floor of the shaker, upon which the roots and foreign material will accumulate while the pulverized soil will be fed progressively across the floor of the shaker toward one side of the implement and finally discharged down a transversely arranged chute 40 and delivered in finely divided condition to the surface of the ground at a point behind what may be termed the furrow-wheel, by analogy to implements which actually form a furrow.

The roots and foreign material accumulated on the grating will be blown therefrom by the action of a power driven blower 41 provided with a nozzle 42 opening through the floor of the shaker and immediately below the screen or grating, and the weed roots and foreign substances thus subjected to the blast from the blower pipe 42 will be projected upwardly and carried through a conveyer pipe 43 and discharged into the top of the burner and caught upon the grating, where they will be subjected to the intense heat of the burner and consumed, the ashes falling through the grating and onto the ground and serving to assist in the fertilization of the soil.

The shaker 38 is suitably mounted to receive a reciprocatory or vibratory movement through the action of a cam wheel 44 suitably driven by belt or other power connections in train with the gasolene engine, it being understood that the character and arrangement of the several power transmitting connections can be of any suitable and convenient type, and that the belt connections shown are intended to serve merely for illustrative purposes. It will further be understood that if the blast occasioned by the blower 41 is deemed inadequate to carry forward the stream of material discharged through the pipe 43, the feeding of such material may be assisted by the provision of positive mechanical feeders of any suitable character.

The operation of the machine may be summarized as follows: As the machine is drawn forward over the surface of the ground the roller will crush down the upstanding weed stalks and mark off a strip of ground to be cleared and pulverized. The side walls of the burner will serve to confine the heat within the strip thus segregated, thereby preventing the spreading of the fire on opposite sides of the implement, and the action of the burner will serve to consume all surface material, including stalks, weeds, leaves, and matted brush, leaving the ground surface clean for the action of the cutters, and eliminating any tendency to clog the machine by an accumulation of surface brush, which might otherwise be occasioned. The rotating cutters, thus cutting through a clean surfaced section of the soil, will act to divide the same into narrow strips or ribbons of convenient width to insure easy handling and final disintegration of the soil by the disintegrating and pulverizing appliances, and the soil thus formed into strips will be easily upturned by the cutting lip 33 of the inclined runway and fed up into the field of action of the cross cutter, which will perform a three-fold function,—in dividing the strips or ribbons of soil into small chunks for convenient treatment by the shaker; loosening the soil from the roots; and cutting up the roots into small sections so that they will be easily discharged by the action of the blower. The cross cutter will also assist materially in feeding or forcing the soil forward so that when it is delivered to the shaker it will be in a loosened and finely divided condition, with the roots in a ground, broken, and disintegrated condition and largely free from the soil, so that the soil will be easily sifted through the screen of the shaker and discharged in finely pulverized condition to the surface of the ground.

The depth of penetration of the circular cutters and the depth of penetration of the cutting lip 33 can be determined with reference to particular ground conditions, depending upon the hardness or the friability of the soil, upon the character of the weeds present, and upon like considerations, but in any event the soil should be cut deep enough to eliminate the crowns and the heavier root growth of the weeds so as to completely destroy the life of the weeds and provide a surface seed bed clean and free from foreign materials.

The invention is peculiarly adapted for the elimination of quack grass in soils which are relatively free from stones or other obstructions, since quack grass can only be eliminated by completely destroying the roots and runners, preferably by the action of fire. The present invention is so designed as to not only completely eliminate these noxious materials from the soil, but the manner of their elimination is such as to completely divide and pulverize the soil as an incident to the purifying operation.

I claim:

1. In a machine of the character described, the combination of a roller for crushing down the upstanding surface growth, a burner for consuming the surface growth, a series of cutters for dividing the soil into strips or ribbons, a cross cutter for breaking the strips or ribbons of soil into chunks, means for delivering the strips or ribbons to the cross cutter, a screen for segregating the roots from the soil, means for delivering the soil from the cross cutter to the screen, and means for discharging the roots, the whole being mounted for transportation across a field, substantially as described.

2. In a machine of the character described, the combination of a burner for consuming the surface growth, a series of cutters for dividing the soil into strips or ribbons, a cross cutter for breaking the strips or ribbons of soil into chunks, means for delivering the strips or ribbons to the cross cutter, a screen for segregating the roots from the soil, means for delivering the chunks to the screen, and means for discharging the roots, the whole being mounted for transportation across a field, substantially as described.

3. In a machine of the character described, the combination of a roller for crushing down the upstanding surface growth, a burner for consuming the surface growth, a series of cutters for dividing the soil into strips or ribbons, a screen for segregating the roots from the soil, means for delivering the soil from the cutter to the screen, and means for discharging the roots, the whole being mounted for transportation across a field, substantially as described.

4. In a machine of the character described, the combination of a burner for consuming the surface growth, a series of cutters for dividing the soil into strips or ribbons, means for lifting the strips or ribbons, a screen to which the soil is delivered for segregating the roots from the soil, and means for discharging the roots, the whole being mounted for transportation across a field, substantially as described.

5. In a machine of the character described, the combination of a roller for crushing down the upstanding surface growth and provided with end flanges for cutting grooves in the soil, a burner behind the roller provided with side walls extended below the soil surface and into the grooves, a series of cutters behind the burner having their cutting edges below the ground level for dividing the soil into strips or ribbons, a chute positioned to enter the soil behind the cutters for directing the strips in an upward direction, a cross cutter to which the strips or ribbons are delivered for dividing the strips into chunks, and means for receiving the cut up chunks of soil and separating the weed roots therefrom, the whole being mounted for transportation across a field, substantially as described.

6. In a machine of the character described, the combination of a roller for crushing down the upstanding surface growth and provided with end flanges for cutting grooves in the soil, a burner behind the roller provided with side walls extended below the soil surface and into the grooves, a series of cutters behind the burner having their cutting edges below the ground level for dividing the soil into strips or ribbons, a chute positioned to enter the soil behind the cutters for directing the strips in an upward direction, a cross cutter to which the strips or ribbons are delivered for dividing the strips into chunks, and an agitator for receiving the cut up chunks of soil and separating the weed roots therefrom, the whole being mounted for transportation across a field, substantially as described.

7. In a machine of the character described, the combination of a roller for crushing down the upstanding surface growth and provided with end flanges for cutting grooves in the soil, a burner behind the roller provided with side walls extended below the soil surface and into the grooves, a series of cutters behind the burner having their cutting edges below the ground level for dividing the soil into strips or ribbons, a chute positioned to enter the soil behind the cutters for directing the strips in an upward direction, a cross cutter to which the strips or ribbons are delivered; for dividing the strips into chunks, means for receiving the cut up chunks of soil and separating the weed roots therefrom, and means for conveying the separated roots to the burner for consuming the same, the whole being mounted for transportation across a field, substantially as described.

8. In a machine of the character described, the combination of a roller for crushing down the upstanding surface growth and provided with end flanges for cutting grooves in the soil, a burner behind the roller provided with side walls extended below the soil surface and into the grooves, a series of cutters behind the burner having their cutting edges below the ground level; for dividing the soil into strips or ribbons, a chute positioned to enter the soil behind the cutters for directing the strips in an upward direction, a cross cutter to which the strips or ribbons are delivered; for dividing the strips into chunks, an agitator for receiving the cut up chunks of soil and separating the weed roots therefrom, and means for conveying the separated roots to the burner for consuming the same, the whole being mounted for transportation across a field, substantially as described.

9. In a machine of the character described, the combination of a burner for consuming the surface growth, a series of power driven circular cutters behind the burner having their cutting edges below the ground level; for dividing the soil into strips or ribbons, means for elevating the strips or ribbons thus divided, a cross cutter to which the strips or ribbons are delivered; for breaking up the strips or ribbons into chunks, and an agitator for separating the roots from the soil, the whole being mounted for transportation across a field, substantially as described.

10. In a machine of the character described, the combination of a burner for consuming the surface growth, a series of power driven circular cutters behind the burner having their cutting edges below the ground level; for dividing the soil into strips or ribbons, means for elevating the strips or ribbons thus divided, a cross cutter to which the strips or ribbons are delivered; for breaking up the strips or ribbons into chunks, an agitator for separating the roots from the soil, and pneumatic means for conveying the separated roots to the burner, the whole being mounted for transportation across a field, substantially as described.

11. In a machine of the character described, the combination of a frame, a roller at the forward end of the frame for crushing down the upstanding surface growth, a burner behind the roller and having walls in close proximity to the ground for confining the heat within the burner, a series of power driven circular cutters having their cutting edges below the ground level; for dividing the soil into strips or ribbons behind the burner, an incline having its forward edge projected below the ground level to feed up the strips or ribbons of soil with the roots therein contained, a cross cutter adjacent to the incline to which the strips or ribbons are delivered; for breaking up the strips or ribbons into chunks, a shaker into which the chunks are delivered, a screen within the shaker for separating the soil from the roots, and means for removing the roots, the whole being mounted for transportation across a field, substantially as described.

12. In a machine of the character described, the combination of a frame, a roller at the forward end of the frame for crushing down the upstanding surface growth, a burner behind the roller and having walls in close proximity to the ground for confining the heat within the burner, a series of power driven circular cutters having their cutting edges below the ground level; for dividing the soil into strips or ribbons behind the burner, an incline having its forward edge projected below the ground level to feed up the strips or ribbons of soil with the roots therein contained, a cross cutter adjacent to the incline to which the strips or ribbons are delivered; for breaking up the strips or ribbons into chunks, a shaker into which the chunks are delivered, a screen within the shaker for separating the soil from the roots, and means for removing the roots and conveying them to the burner, the whole being mounted for transportation across a field, substantially as described.

13. In a machine of the character described, the combination of a frame, a roller at the forward end of the frame for crushing down the upstanding surface growth, a burner behind the roller and having walls in close proximity to the ground for confining the heat within the burner, a series of power driven circular cutters having their cutting edges below the ground level;

for dividing the soil into strips or ribbons behind the burner, an incline having its forward edge projected below the ground level to feed up the strips or ribbons of soil with the roots therein contained, a cross cutter adjacent to the incline to which the strips or ribbons are delivered; for breaking up the strips or ribbons into chunks, a shaker into which the chunks are delivered, a screen within the shaker for separating the soil from the roots, and pneumatic means for removing the roots and conveying them to the burner, the whole being mounted for transportation across a field, substantially as described.

14. In a machine of the character described, the combination of a roller for crushing down the upstanding surface growth, a burner having side walls extending below the ground surface for confining the fire within the burner, means for projecting jets of flame under pressure to the burner for creating an intense heat therein, a series of power driven circular cutters behind the burner having their cutting edges below the ground level; for dividing the soil into strips or ribbons, an incline behind the series of cutters and having its lower edge projected below the ground level to upturn the strips or ribbons of soil and cause the same to be fed up the incline, a cross cutter in proximity to the incline to which the strips or ribbons are delivered; for breaking the strips or ribbons of soil with the roots therein contained into chunks, a shaker screen to which the chunks are delivered and adapted to separate the soil from the roots, and a pneumatic blower for separating the roots from the soil and conveying the roots to the burner, the whole being mounted for transportation across a field, substantially as described.

EUGENE C. GRAVES.